Nov. 13, 1956     W. H. BENDALL     2,770,144

FLEXIBLE LINK CHAIN

Filed June 12, 1952

INVENTOR.

Wilfrid H Bendall

United States Patent Office 2,770,144
Patented Nov. 13, 1956

2,770,144

FLEXIBLE LINK CHAIN

Wilfrid H. Bendall, New York, N. Y.

Application June 12, 1952, Serial No. 293,158

14 Claims. (Cl. 74—245)

This invention relates generally to drive chains for power transmission purposes. In particular the present application is a continuation-in-part of my copending application Serial Number 210,586, filed February 12, 1951, and is a further development of the flexible link chain principle and constructional ideas described in a related United States patent, No. 2,062,115, issued to me November 24, 1936, and in United States Patent No. 2,551,578, issued to me May 8, 1951.

As is well known to those skilled in the art, and as set forth in the copending application, the rigid link chains in wide use at the present time may be considered a relatively uneconomical power transmission medium in the light of modern drive requirements. For operation at low speeds such chains are needlessly refined and expensive, while at higher speeds the pinbearing limitation, weight and destructive impact—inherent in the rigid link chain operating principle—again prevent effective use of a high intrinsic strength and refined manufacture.

The flexible link chain avoids these difficulties by utilizing functionally flexible, relatively light and resilient, link members. Such link members enable a substantially continuous flexural chain action in place of the articulated, angularly fluctuating link action of the rigid link chains.

As reference to the abovementioned copending and issued patent applications will show, this flexible link chain construction is generally characterized by the use of a series of operationally flexible link members adapted through their flexibility to conform to a substantially circular sprocket engagement pitch line. These flexible link members are further provided with apertures for clearing the drive sprocket teeth and for insertion of similarly flexible interconnecting members, which directly engage the sprocket teeth. Chains of this construction, in their ability to flexibly conform to the sprocket pitch circle—commonly recognized as the imaginary circular line through the sprocket teeth with which a line through the link pitch centers coincides when engaging the sprocket teeth—thus embody substantial operating and performance advantages over rigid link chains whose links cannot flex to coincide with the sprocket pitch circle and are thus, as is well known, inherently subject to objectionable angular speed fluctuation and destructive impact effects.

In view, however, of the standardized manufacture and extensive marketing facilities of the rigid link chains, it becomes economically desirable that an improved flexible link chain construction, such as that of the present invention, utilize established industrial facilities and practices to the fullest possible extent. The well-known rigid link roller type drive chain and sprockets, for example, as built to industry approved standards, constitute, within their design limits, a drive medium of great versatility and practically world wide use and availability. Drive sprockets for these chains, furthermore, are obtainable from most manufacturers of gears and related power transmission components. It is thus apparent that a flexible link chain able to supplement the standard roller chain and further extend the range of chain drive applications by using the same drive sprockets and installation procedure, would constitute a new and particularly useful contribution to the art of chain driving.

Accordingly, it is a major object of the present invention to provide a flexible link chain adapted for efficient operation on standard roller chain sprockets.

Additional important objects of the invention are: to provide flexible link chains of wider operating speed and horsepower range than equivalent size standard roller chains; to provide a flexible link chain of simple design and construction; a chain more economical to manufacture, install and operate than the standard roller chain, and more versatile and efficient in performance; and finally, a flexible link chain construction conveniently adapted to automatic machine assembly.

These and other objects and advantages of this invention will be apparent from the ensuing description of its construction and operating principle, and from reference to the accompanying drawings in which, Fig. 1 is a perspective view of one of the flexible link interconnecting members of the chain embodying this invention.

Figure 1:
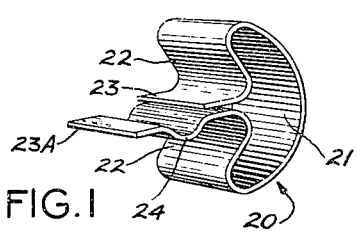

In Fig. 1, reference numeral 20 designates a flexible chain link interconnecting member constructed of flexible sheet material and provided with a transversely curved center portion 21, substantially conforming in curvature with the tooth gap curvature of standard roller chain sprockets of the size it is required to engage. Integral extensions 22, 22, at each end of the curved center portion are formed by doubling the material over the center portion, while end portions 23, 23A are formed by further turning the link material normal, or at right angles, to the curved center portion, thus forming two substantially parallel end portions projecting at right angles to the curved center portion, and substantially opposite the center thereof.

Figure 2:
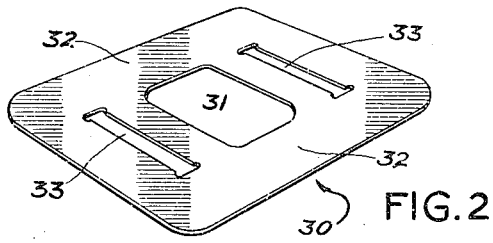
Fig. 2 is a perspective view of another flexible link member, for interconnection with link members of the type illustrated in Fig. 1.

In Fig. 2, reference numeral 30 designates a typical flat apertured flexible link member, likewise constructed of flexible sheet material and provided with a transverse central aperture 31 and transverse end apertures 33, between longitudinal side portions 32. The longitudinal spacing of the apertures 33 substantially determines the link pitch dimension of the chain assembled from the two forms of link members thus described.

Figure 3:
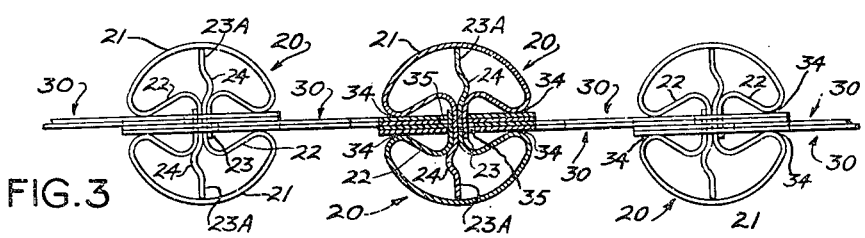
Fig. 3 is a side elevational view, sectioned on the line 3—3 of Fig. 4, of a portion of a flexible link chain assembled from the interconnecting and link members of the type illustrated in Figs. 1, and 2.
Figure 4:
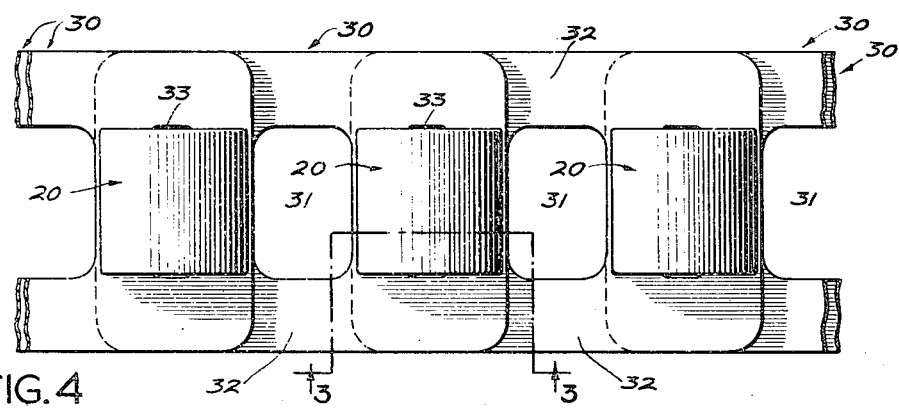
Fig. 4 is a plan view of the portion of the assembled flexible link chain illustrated in Fig. 3.

Reference to Figs. 3 and 4 shows how these members are interconnected to form the chain of this invention. It will first be remarked that Fig. 3 shows two superimposed flat link members 30, per pitch length of the chain. It is to be understood, however, that either one, or more than two such flat link members may be used per pitch length, if desired; two or more being considered preferable in the interests of flexibility, reliability and strength proportionate to other dimensions determined by the permissible working clearances and load capacity of the drive sprocket the chain is required to engage.

The flat flexible link members are arranged end to end, as shown, with overlapping end portions and registering apertures 33, in the end portions. To positively interconnect them the link interconnecting members 20 are arranged on opposite sides of the registering end apertures, with extensions 23 and 23A turned toward the apertures. Moving them toward each other in this position causes the extensions to enter the registering apertures and overlap therein, as shown in the cross-sectioned portion of Fig. 3. During this assembly operation sufficient pressure is applied to ensure that the curved portions of the link interconnecting members are finally in bearing contact 34, with the overlapped end portions of the apertured flat link members 30, on each side thereof.

It will be observed that the registering apertures 33 are given sufficient width to provide clearances, 35 in Fig. 3, which accommodate a slight spreading of the interconnecting member extensions during the assembly operation described above. This is necessitated by the structural feature of the extended end portion 23A, of each interconnecting member, which is made somewhat longer than the other and provided with a kink or corrugation 24, comprising, with the inherently flexible link structure, a resilient means for engaging and interlocking with a curved portion of an identically shaped oppositely assembled interconnecting member. This interlocking feature serves to secure the assembled members against accidental separation while still permitting convenient disassembly and reassembly, whenever required. Assembled thus, the flexible link members are positively interconnected to transmit a tensional working pull and are held in substantially continuous flexural contact with each other.

The substantially straight-line interlocking assembly of the interconnecting members at right angles to the apertured link members, as described above, conveniently adapts the design of this flexible link chain for high speed automatic machine assembly of these parts.

From further consideration of the cross-sectioned portion of Fig. 3, it will be apparent that a working pull transmitted through each group of flat flexible link members 30, is necessarily offset by the distance between the neutral axis of each group at the overlapped end portions. This results in a small unbalanced force tending to rotate each such overlapped assembly about its geometrical center. This force is effectively opposed, however, by the longitudinally spaced restraint imposed equally on each side of the center by the aforementioned bearing contact 34, of each curved interconnecting member portion 22, with the flat link members.

The restraint imposed at these points serves an important dual purpose in that in addition to stabilizing the overlapped joint assembly, as described above, it also maintains the ends of the flat link members at a substantially constant radius of curvature when the chain is engaging a drive sprocket.

Figure 5:
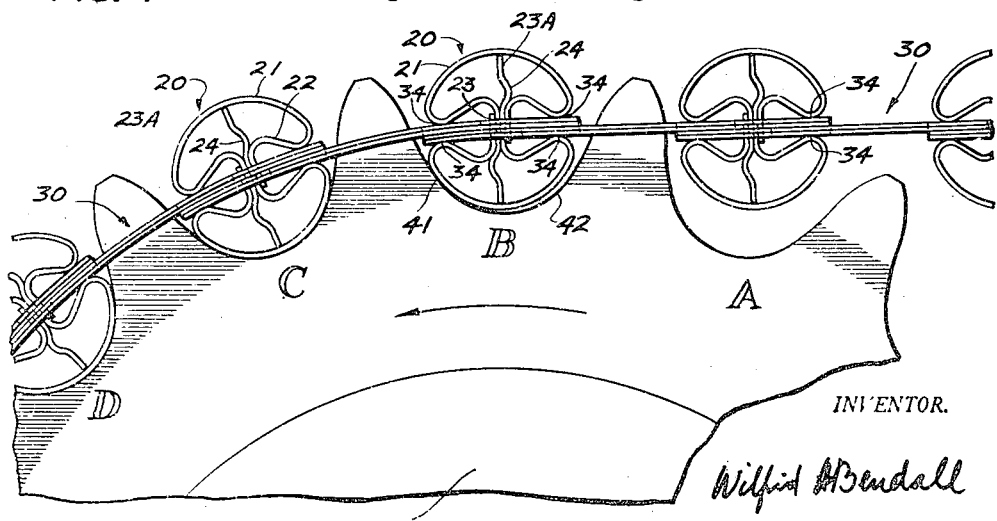
Fig. 5 is a fragmentary side elevational view of the chain of Figs. 3 and 4 engaging a drive sprocket of standard roller chain tooth form.

Reference to Fig. 5, where the chain is shown engaging a standard roller chain drive sprocket at its theoretical pitch circle, illustrates the foregoing and other advantageous features of the flexible link chain drive. The sprocket, designated by reference numeral 40, is assumed to be rotating in the direction indicated by the arrow. At position A, in the straight or drive strand portion of the chain, an interconnecting member is shown entering the sprocket tooth gap. At position B, the approximate point of drive strand tangency, an interconnecting member is in partial supporting contact with the sprocket tooth gap at 41 and is about to complete its seating therein at 42. At C and D, past the point of drive strand tangency, seating is completed and the interconnecting members are in full chain supporting and driving engagement with the sprocket teeth.

The flexible link chain engagement action with the drive sprocket, as described above, is substantially flexural. Since the flexible links readily conform to the theoretical pitch circle of the sprocket, as required for efficient performance, there is no articular, or independent swinging action of the links with resulting angular speed fluctuation and impact, such as obtains with rigid link chains. An additionally advantageous characteristic is that during engagement, the progressively curving flat link members, between positions B and C for example, exert a substantial spring force, acting radially outwards and supporting the engagement phase between positions A and B. This inherent spring force of the flat link members effectively inhibits impact with the sprocket teeth. Power transmission is thus accomplished with negligible disturbance and the mechanical efficiency of the drive is high.

Another important respect in which the flexible link chain of the present invention improves upon rigid link chains generally and the standard roller chain in particular, is in its considerably more resilient, and thus more effectively distributed, total working engagement with the sprocket. As will be apparent from Fig. 5, a line through the pitch centers of the chain on the sprocket, which will coincide with the theoretical sprocket pitch circle and will also represent the line of working pull thereon, will lie radially outside a circular line through the mean sprocket tooth contacts, located in the region of the reference numerals 41 and 42, where the curved interconnecting member portions 21, engage the sprocket teeth. The working load is thus, in practical effect, transmitted through a series of double cantilevers, utilizing the inherent resilience of these members.

Fig. 5 also illustrates the use of the bearing contact 34 of the curved member portions 22 against the ends of each overlapped flat link member, to ensure substantially uniform flexure of the latter when engaging a drive sprocket. As shown at position B, for example, the ends of the flat link members, which would otherwise spring apart under curvature, are held to a constant mean drive radius by the bearing contact 34 with the interconnecting members.

Flexible link chains of the type described in the foregoing specification may readily be assembled manually or automatically, in required lengths, and can be manually detached without tools by simply pulling the resiliently interlocked extensions of the interconnecting members out of the registering apertures in the ends of the flat link members. Such disassembly, it should be noted, is readily accomplished without disturbing the sprocket center distance or mounting of an installed drive.

While the interconnecting member 20 is shown as constructed of a single thickness of flexible material, its structure may obviously comprise two or more layers of flexible material. The curved portion, 21, of this member, may also be differently shaped to modify the sprocket engagement characteristics or to engage sprockets of different tooth form. The extended end portion 23A, may alternatively be doubled over on itself to form a hook-shaped locking device and is susceptible of numerous such modifications.

Such structural variations are cited to emphasize that the present invention is not limited to the embodiments shown herein and that it is capable of numerous modifications of shape, size, arrangement and processing of the cooperating parts without departing from the spirit of the invention or the scope of the appended claims.

I claim:

1. A flexible link chain comprising apertured links of flexible sheet material disposed end to end with overlapping end portions and registering apertures in said end portions, and link interconnecting members of like material having a transversely curved center portion with extensions thereof doubled over said center portion and end portions turned normal thereto passing through said registering apertures.

2. A flexible link chain comprising apertured links of flexible sheet material disposed end to end with overlapping end portions and registering apertures in said end portions, and link interconnecting members of like material assembled on opposite sides of said overlapping end portions each of said link interconnecting members having a transversely curved center portion with extensions thereof doubled over said center portion and end portions thereof turned normal thereto passing through said registering apertures.

3. A flexible link chain comprising apertured links of flexible sheet material disposed end to end with overlapping end portions and registering apertures in said end portions, and link interconnecting members of like material assembled on opposite sides of said overlapping end portions, each of said interconnecting members having a transversely curved center portion with extensions thereof doubled over said center portion and end portions turned normal thereto passing through said registering apertures, said end portions of said interconnecting members being shaped for resiliently sprung interconnection with end portions of an oppositely assembled interconnecting member.

4. A flexible link chain comprising apertured links of flexible sheet material disposed end to end with overlapping end portions and registering apertures in said end portions, and interconnecting members of like material having a transversely curved center portion with extensions thereof doubled over said center portion and end portions thereof turned normal thereto passing through said registering apertures, said extensions thereof being in supporting contact wtih said overlapping end portions.

5. A flexible link chain comprising apertured links of flexible sheet material disposed end to end with overlapping end portions and registering apertures in said end portions interconnected by members of like material having a curved center portion with end portions thereof turned at right angles to said center portion passing through said registering apertures.

6. A flexible link chain comprising apertured links of flexible sheet material disposed end to end with overlapping end portions and registering apertures in said end portions interconnected by members of like material having a curved center portion with end portions thereof turned at right angles to said center portion passing through said registering apertures and engaging transverse edges of said apertures.

7. A flexible link chain comprising apertured links of flexible sheet material disposed end to end with overlapping end portions and registering apertures in said end portions interconnected by oppositely disposed members of like material each having a curved center portion with end extensions thereof passing through said registering apertures and overlapping end portions of an oppositely disposed member.

8. A flexible link chain comprising apertured links of flexible sheet material disposed end to end with overlapping end portions and registering apertures in said end portions interconnected by oppositely disposed members of like material each having a curved center portion with curved end extensions thereof in spaced bearing contact with said overlapping end portions and further extensions thereof passing through said registering apertures.

9. A flexible link chain comprising apertured links of flexible sheet material disposed end to end with overlapping end portions and registering apertures in said end portions interconnected by opposed pairs of link interconnecting members each having a transversely curved center portion with end portions thereof turned substantially radial to said center portion passing through said registering apertures.

10. A flexible link chain comprising apertured links of flexible sheet material disposed end to end with overlapping end portions and registering apertures in said end portions interconnected by opposed pairs of link interconnecting members each having a transversely curved center portion with end portions thereof turned substantially radial to said center portion passing through said registering apertures and resiliently interlocking with portions of an opposed link interconnecting member.

11. A flexible link chain comprising apertured links of flexible sheet material disposed end to end with overlapping end portions and registering apertures in said end portions interconnected by opposed pairs of link interconnecting members each having a transversely curved center portion with transversely curved extensions thereof bearing against the apertured links and end portions turned substantially radial thereto passing through said registering apertures.

12. A flexible link chain comprising apertured links of superimposed layers of flexible sheet material disposed end to end with overlapping end portions and registering apertures in said end portions interconnected by opposed pairs of sprocket engaging members, said sprocket engaging members being shaped for interlocking connection with each other and having a sprocket engaging portion external to the aperture links and an interlocking portion passing through the registering apertures in said overlapping end portions.

13. A sprocket engaging chain comprising apertured links of flexible sheet material disposed end to end with overlapping end portions and registering apertures in said end portions, and link interconnecting members each comprising a looped length of flexible material with the looped portion thereof shaped for sprocket engagement and end portions thereof passing through said registering apertures.

14. A sprocket engaging chain comprising apertured links of flexible sheet material disposed end to end with overlapping end portions and registering apertures in said end portions, and link interconnecting members each comprising a looped length of flexible material with the looped portion thereof shaped for sprocket engagement and end portions thereof passing through said registering apertures and interlocking with each other.

References Cited in the file of this patent

UNITED STATES PATENTS

| | | |
|---|---|---|
| 310,104 | Wilson | Dec. 30, 1884 |
| 452,122 | Kotter | May 12, 1891 |
| 618,083 | Gentry | Jan. 24, 1899 |
| 1,202,773 | Bandur | Oct. 31, 1916 |
| 1,274,344 | Staub | July 30, 1918 |
| 1,955,181 | Goddard | Apr. 17, 1934 |
| 2,062,115 | Bendall | Nov. 24, 1936 |
| 2,130,548 | Jones | Sept. 20, 1938 |
| 2,208,878 | Wiley | July 23, 1940 |
| 2,321,702 | Renkin | June 15, 1943 |

FOREIGN PATENTS

| | | |
|---|---|---|
| 200,832 | Great Britain | Oct. 13, 1924 |